(12) United States Patent
Liang et al.

(10) Patent No.: US 12,155,305 B2
(45) Date of Patent: Nov. 26, 2024

(54) BOOST CONVERTER WITH WIDE AVERAGE CURRENT LIMITING RANGE

(71) Applicant: Texas Instruments Incorporated, Dallas, TX (US)

(72) Inventors: Jian Liang, Shanghai (CN); Chen Feng, Shanghai (CN); Zichen Feng, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 271 days.

(21) Appl. No.: 17/936,930

(22) Filed: Sep. 30, 2022

(65) Prior Publication Data
US 2024/0113621 A1 Apr. 4, 2024

(51) Int. Cl.
*H02M 3/158* (2006.01)
*H02M 1/00* (2007.01)

(52) U.S. Cl.
CPC ......... *H02M 3/158* (2013.01); *H02M 1/0009* (2021.05)

(58) Field of Classification Search
CPC .............................. H02M 1/0009; H02M 3/158
See application file for complete search history.

(56) References Cited

U.S. PATENT DOCUMENTS

| | | | |
|---|---|---|---|
| 9,837,898 B2 | 12/2017 | Deng | |
| 2008/0122417 A1 | 5/2008 | Ng | |
| 2011/0018507 A1* | 1/2011 | McCloy-Stevens | H02M 3/1588 323/271 |
| 2015/0229160 A1* | 8/2015 | Kawakami | H02M 3/156 307/64 |
| 2017/0373594 A1* | 12/2017 | Childs | H02M 1/08 |
| 2019/0089245 A1 | 3/2019 | King | |
| 2020/0328679 A1 | 10/2020 | Shu | |
| 2021/0083583 A1 | 3/2021 | Becker | |
| 2022/0360171 A1* | 11/2022 | Oner | H02M 1/0032 |
| 2024/0146195 A1* | 5/2024 | Attanasio | H02M 1/0006 |

OTHER PUBLICATIONS

International Search Report mailed Jan. 25, 2024.

* cited by examiner

*Primary Examiner* — Sisay G Tiku
(74) *Attorney, Agent, or Firm* — Charles F. Koch; Frank D. Cimino

(57) ABSTRACT

A boost converter that provides a wide average current limiting range includes a switch coupled to an inductor output and a power input, a diode coupled to the inductor output and an output terminal load and configured to conduct current in only one direction away from the inductor output and toward the output terminal, a clamp circuit coupled to the diode and the switch, and a minimum time off module coupled to the diode and the switch. The clamp circuit is configured to clamp an inductor output current to a reference current while the converter is operating in a continuous conduction mode (CCM) of operation. The minimum time off module is configured to cause the inductor output current to be zero for at least a time $T_{off}$ while the converter is operating in a pulse frequency modulation (PFM) mode of operation.

19 Claims, 8 Drawing Sheets

BOOST CONVERTER WITH WIDE AVERAGE CURRENT LIMITING RANGE

TECHNICAL FIELD

This description relates to electronic circuits, and more particularly, to electronic circuits that convert a source of direct current (DC) from one voltage level to another.

BACKGROUND

DC-to-DC converters are devices that convert the voltage of a DC power source, such as a battery or other power supply, to a different voltage level for consumption by one or more other components, also referred to as a load. For example, a boost converter is a type of DC-to-DC converter that produces an output voltage that is higher than the input voltage, while reducing, or stepping down, current. The boost converter uses a switched inductor to buffer energy that can be periodically supplied to a load at a higher voltage than supplied to the inductor. A downstream capacitor temporarily powers the load independently of the power source while the inductor is buffering energy. The periodic storage of energy to, and discharge from, the inductor and capacitor can be controlled to achieve the desired voltage and current at the output of the converter.

SUMMARY

DC-to-DC converters, and in particular, boost converters that provide a relatively wide current limiting range, are described herein.

In an example, a DC-to-DC boost converter includes a switch, a diode, a clamp circuit, and a minimum time off module. The switch is coupled to an inductor output and a power input. The diode is coupled to the inductor output and an output terminal of the DC-to-DC boost converter. The diode is configured to conduct current in only one direction away from the inductor output and toward the output terminal of the DC-to-DC boost converter. The clamp circuit is coupled to the diode and the switch. The clamp circuit is configured to clamp an inductor output current to a reference current while the DC-to-DC boost converter is operating in a continuous conduction mode (CCM) of operation. The minimum time off module is coupled to the diode and the switch, the minimum time off module configured to cause the inductor output current to be zero for at least a time $T_{off}$ while the DC-to-DC boost converter is operating in a pulse frequency modulation (PFM) mode of operation.

Another example is a method of controlling a DC-to-DC converter. The DC-to-DC converter includes a switch coupled to an inductor output and a power input, and a diode coupled to the inductor output and an output terminal of the DC-to-DC boost converter. The method includes clamping, by a clamp circuit and in a continuous conduction mode (CCM) of operation, an inductor output current to a reference current. The method further includes causing, by a minimum time off module and in a pulse frequency modulation (PFM) mode of operation, the inductor output current to be zero for at least a time $T_{off}$.

Another example is a device including a power source input, a DC-to-DC boost converter coupled to the power input, and a load input coupled to an output terminal of the DC-to-DC boost converter. The power input is configured to provide, to the DC-to-DC boost converter, an output voltage of at most 1.5 volts and an output current of at most 1.5 amps. The DC-to-DC boost converter is configured to provide, to the load input, an output voltage of greater than 1.5 volts and an output current of at least 5 milliamps.

DETAILED DESCRIPTION

Figure 1:
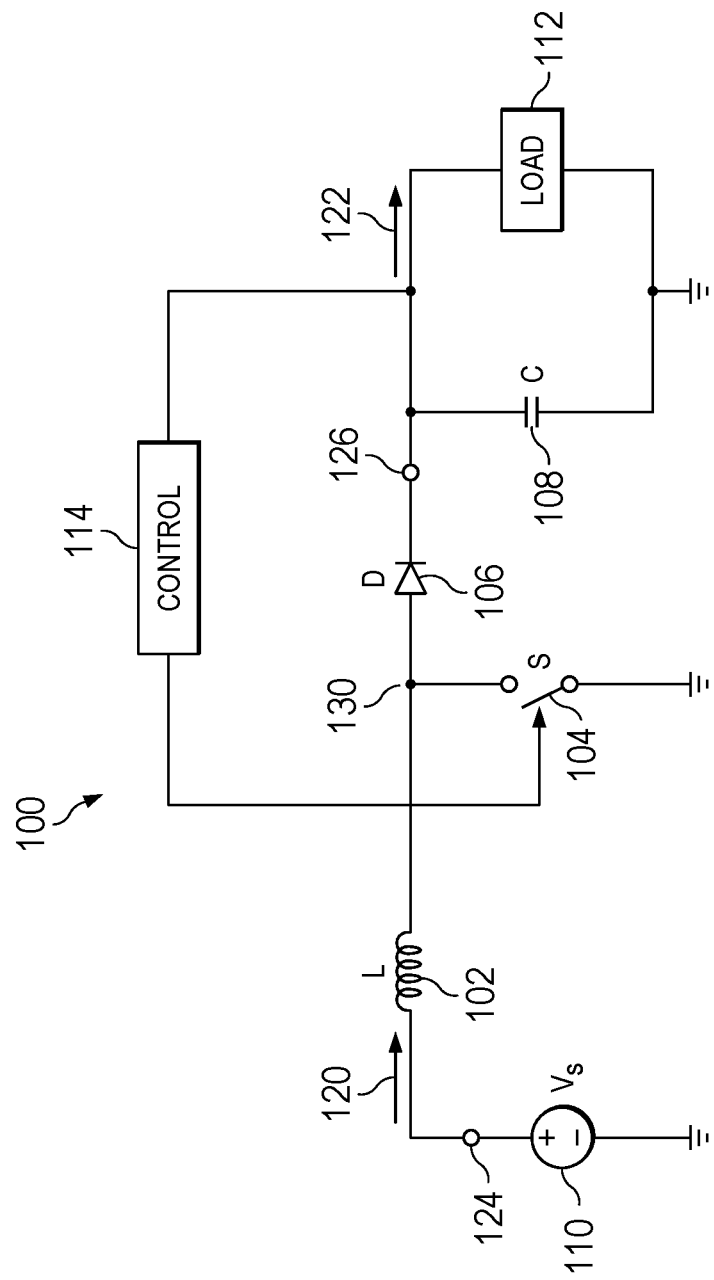
FIG. 1 is a schematic diagram of an example boost converter.

DC-to-DC converters, and in particular, boost converters that provide a wide average current limiting range, are described herein. In an example, a boost converter can be controlled such that the average current of the inductor remains within one or more targeted limits (high, low, or both), as opposed to controlling the converter by only limiting the inductor peak (high) or valley (low) currents. In some such examples, the converter controls the average current limit to provide a wide current limit range from approximately 5 mA to 1.5 A with an inductor peak current of greater than approximately 200 mA while operating in either continuous conduction mode (CCM) or pulse frequency modulation (PFM) mode, which are described in further detail below. In some examples, any inductor peak and valley current error caused by circuit response delay is adaptively compensated as a function of the input and output voltages to reduce or eliminate overshooting the target average current limit. In some other examples, the converter control voltage is clamped near the switch trigger voltage under light loads to limit first cycle current limit error during load transients. Although the techniques described herein can be used in any number of applications, they are particularly well-suited for battery-powered applications with low currents, for example, approximately 1.5 amps (A) or less. Examples of such applications include medical sensors, smart home systems, tablet devices, wearable devices, power metering devices, or other devices that are powered by a coin-cell type or other low voltage battery (e.g., a battery that provides between approximately 0.9 and 1.5 volts and has a resistance of less than approximately 20 ohms) and have an operational requirement for a power rail at or above the battery voltage (e.g., at or above 0.9-1.5 volts).

General Overview

Some DC-to-DC converters operate within a relatively narrow range of current limits, such as between approximately 250 milliamps (mA) and 1 amp (A), by limiting the inductor peak and/or valley currents. However, such boost converters cannot operate if the power source, such as a battery, provides a current (e.g., approximately 10 mA or less) below the operational inductor valley current limit of the converter. If existing boost converter designs that limit inductor peak and valley current are modified to operate at low current (e.g., 10 mA or less), a larger inductor is needed to store a sufficient amount of energy to power the load, which is inefficient due to the switching losses of the inverter in relation to the power output by the converter, as well as more expensive hardware, such as external sense resistors, that further reduces efficiency.

To this end, DC-to-DC converters and techniques for DC-to-DC power conversion with a wide current limiting range (e.g., between approximately 5 mA and 1.5 A) are described. As used herein, the phrase "inductor current" refers to a current flowing out of the inductor of the converter. As used herein, the phrase "average current" refers generally to a value representing the average magnitude of two or more currents, such as one-half of the sum of the inductor valley current and the inductor peak current. The average current, in some examples, can represent the actual inductor current averaged over a period of time, such as over one or more switching cycles of the converter (e.g., the time between successive charging or discharging sequences of the inductor). As used herein, the phrase "average current limit" refers to a maximum or minimum average current, which may be pre-configured or configurable, and can include a range of values including and between the inductor peak and/or valley current.

In some examples, a boost converter can operate in one or more modes in which the inductor peak and/or valley currents are sensed and regulated to provide a pre-configured or configurable average current limit (e.g., any value or range of values between and including approximately 5 mA and 1.5 A). In particular, the inductor valley (low-side) current is regulated in proportion to the actual ($I_L$) or error-adjusted ($I_{EA}$) output current of the inductor, and the inductor peak (high-side) current is regulated in proportion to the actual or error-adjusted output current of the inductor plus the hysteresis current of the inductor using CCM and/or PFM, depending on the target average current limit. In some examples, the inductor output current is adjusted to compensate for peak and/or valley inductor current error caused by circuit response delays. In some examples, the inductor is 1 microhenry (µH). In some examples, the reference current, sense ratio, the hysteresis current value, and/or other design parameters of the converter can be programmed via external pins on silicon (or other semiconductor) or by internal one-time-programming (OTP) of the circuit.

For example, in CCM, the converter is configured to clamp the inductor output current based on a comparison with a reference current and a hysteresis current value, which are pre-configured or configurable design values selected to achieve the target average current limit for relatively high current loads (e.g., greater than approximately 250 mA). In theory, the average current limit in CCM is one-half of the sum of the inductor peak and valley currents, which can also be represented as the reference current plus one-half of the hysteresis current value. In some examples, the average current limit is multiplied by a sense ratio associated with the current sensing components (e.g., a field effect transistor or FET). For instance, if the target average current limit is 1.5 A and the current sense ratio is 10K, then the reference current can be selected as 130 µA and the hysteresis current value can be selected as 40 µA. Thus, for a current limit range between approximately 250 mA and 1.5 A, the converter senses the inductor output current and compares the inductor output current with a pre-configured or configurable reference current. If the sensed current is higher than the reference current, the converter clamps the output of an error amplifier (amplifying the inductor output current) so that the inductor current is limited to the preset level. Different current limits can be achieved using different reference current levels.

In another example, in PFM, the converter is configured to maintain the inductor current at zero for at least a minimum amount of time based on the inductor peak current, which is a pre-configured or configurable design value selected to achieve the target average current limit for relatively low current loads (e.g., less than approximately 250 mA and as low as approximately 5 mA). In theory, average current limit in PFM is one-half of the inductor peak current multiplied by the ratio of time during which the inductor current is non-zero with respect to the total switch cycle time (over which the inductor current is both zero and non-zero). The inductor peak current can also be represented as one-half of the sum of the sensed inductor current and the hysteresis current. The average current limit can thus be achieved by controlling minimum off time period (zero inductor current) as a function of the sensed inductor current, the hysteresis current, and the current sense ratio, which limits the inductor peak current and the average current limit.

Modes of Operation

As described above, in some examples, the boost converter can operate in CCM, where current flows out of the inductor continuously, and/or in PFM or discontinuous conduction mode, where current flowing out of the inductor falls to zero. To control the average current limit while the converter is operating in CCM, the maximum output current of the inductor is clamped to a pre-configured or configurable reference current, which limits the inductor average current to a range of currents including the inductor valley current plus one-half of the hysteresis current. To control the average current limit while the converter is operating in PFM, the minimum time during which the inductor current is zero ($T_{off}$) is controlled as a function of the peak inductor current and the time during which the current is non-zero (switched on) to limit the inductor average current to a range of currents including one-half of the inductor peak current multiplied by the ratio of inductor charging (on) time to the total switching cycle time. In this manner, the converter can efficiently cover a wide average current limit as low as approximately 5 mA (in PFM) to as high as approximately 1.5 A (in CCM) using a small inductor (e.g., 1 µH) and protect the power source or battery from an overcurrent condition. This is in contrast to alternative converter designs where the minimum current in CCM or PFM is approximately 100-200 mA and which require an additional current loop and an external sense FET or resistor (with additional connection pins on chip to monitor the FET/resistor), or a large (e.g., 47 µH) inductor.

Boost Converter Architecture

FIG. 1 is a schematic diagram of an example boost converter 100. The boost converter includes an inductor output 130 of an inductor (L) 102, a switch (S) 104, a diode (D) 106, and a capacitor (C) 108. A DC power source $V_s$ 110 is coupled at a power input 124 in series with the inductor 102, and a load input of a load 112 is coupled to an output terminal 126 in parallel with the capacitor 108. When the switch 104 is closed, current 120 flows through the inductor 102 and the inductor output 130 in the clockwise direction and the inductor 102 buffers energy. Polarity of the left (source or input) side of the inductor 102 is positive, causing the diode 106 to block output current 122 to the capacitor 108 and the load 112. The load 112 is thus powered by the capacitor 108. When the switch 104 is open, the current 120 into the inductor 102 is reduced due to the impedance of the inductor 102 and the energy stored in the inductor 102 discharges as current to the load 112. As a result, the polarity across the inductor 102 is reversed (polarity of the right or output side of the inductor 102 is positive), charging the capacitor 108 through the diode 106.

Figure 2:
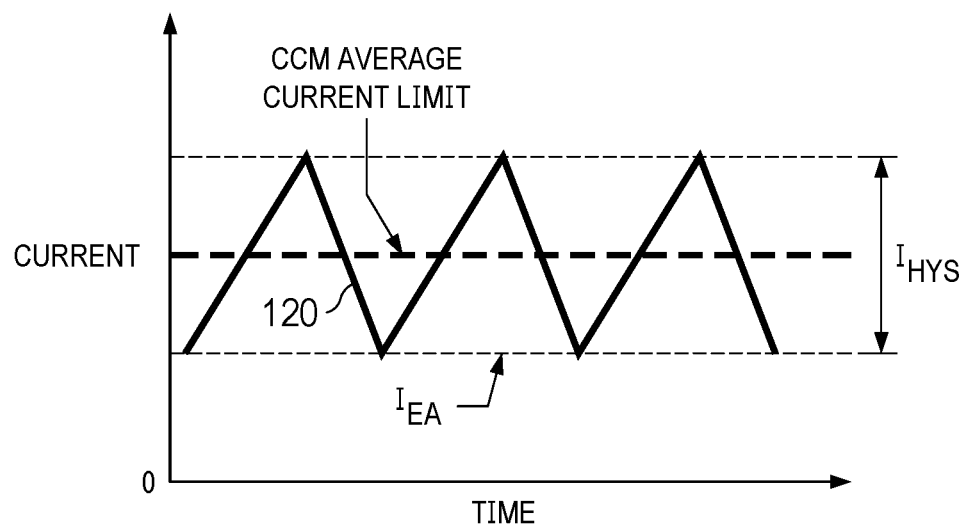
FIG. 2 illustrates example current waveforms of the converter of FIG. 1 while the converter is operating in a continuous conducting mode.
Figure 3:
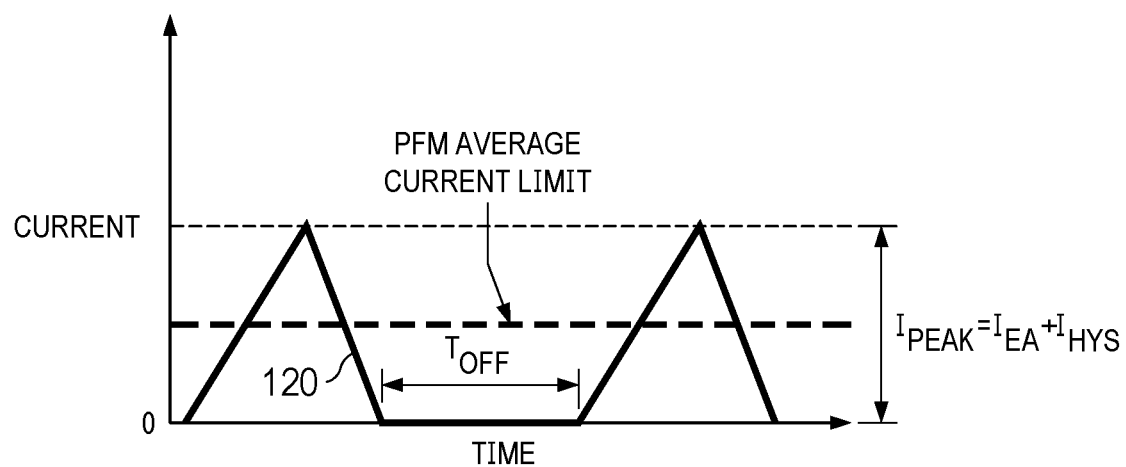
FIG. 3 illustrates example current waveforms of the converter of FIG. 1 while the converter is operating in a pulse frequency modulation mode.

A control portion 114 of the converter 100 includes the switch 104 and other components) for controlling the switch 104, such as described in further detail with respect to FIGS. 4-9. The control portion 114 is configured to operate the converter 100 in either CCM or PFM such that the inductor average current is maintained within a desired range. The desired range may be, for example, a pre-configured or configurable range. While the converter 100 is operating in CCM, the inductor output current 120 is above zero, such as shown in FIG. 2. If the peak of the inductor current 120 (e.g., approximately 100 mA) is less than the DC component of the inductor current 120, the output current 122 through the diode 106 is positive and the diode 106 is on while the switch 104 is open. By contrast, during PFM or discontinuous conduction mode, the inductor current 120 falls to zero while the switch 104 is open, such as shown in FIG. 3. If the peak of the inductor current 120 is more than the DC component of the inductor current 120, the inductor current 120 falls to zero while the diode 106 is conducting. Thus, the diode 106 turns off and the inductor current 120 remains at zero until the switch 104 is closed due to the polarity reversal across the switch 104. During this time the load 112 is powered from the capacitor 108.

Boost Converter Control

Figure 4:
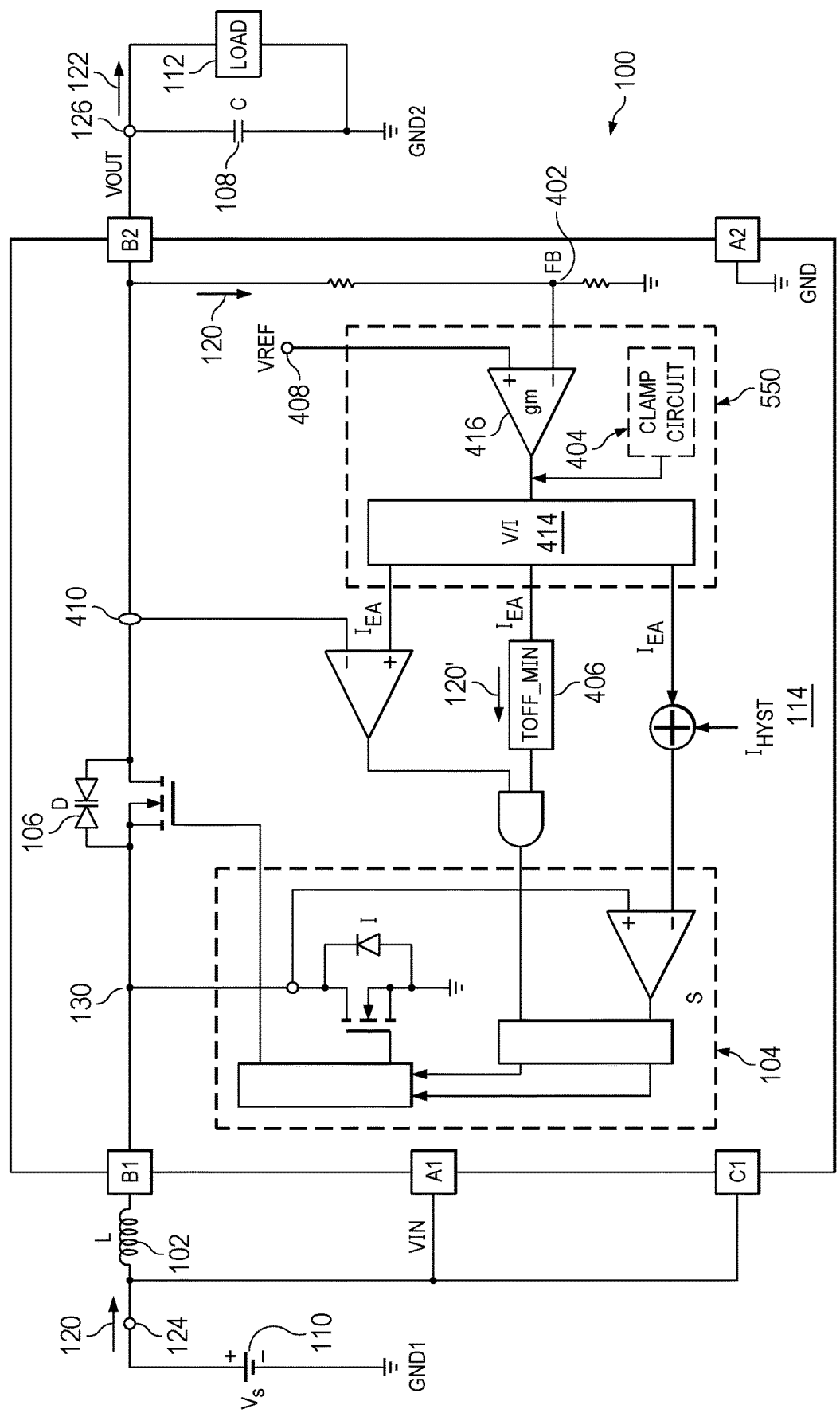
FIG. 4 is a schematic diagram of another example of the converter of FIG. 1 including a clamp circuit and a minimum time off module.

FIG. 4 is a schematic diagram of another example of the boost converter 100 of FIG. 1. The control portion 114 of the converter 100 includes a feedback circuit that compares a feedback voltage (FB) at node 402 with a reference voltage (VREF) at input node 408 and regulates the inductor current 120 such that the inductor average current remains within the configured limits. In some examples, the feedback circuit generates an error-adjusted inductor current 120' ($I_{EA}$) to compensate for circuit response delays, such as described in further detail below. However, the error-adjusted inductor current 120' is used to represent the actual inductor current 120 or an approximation thereof.

In more detail, the feedback circuit includes a clamp circuit 404 and a minimum time off module 406. Feedback node 402 (FB) is compared with the reference voltage at the input node 408 (VREF) by a transconductance (gm) amplifier 416. The gm amplifier outputs an error voltage, which is converted to current 120' ($I_{EA}$) by a voltage-to-current converter 414. The current 120' ($I_{EA}$) is compared with an inductor sense current 410 for regulating the inductor current 120. The clamp circuit 404 is configured to clamp the gm amplifier output, so that the current 120' ($I_{EA}$) and the inductor current 120 are also clamped. The limit of the inductor current 120, 120' ($I_{EA}$) is based on the sensed inductor peak current 410 and a pre-configured or configurable current sense ratio K while the converter 100 is operating in CCM, such as described in further detail with respect to FIGS. 5 and 6. This results in the inductor average current remaining at or within the configured limits while the converter 100 is operating in CCM.

Figure 5:
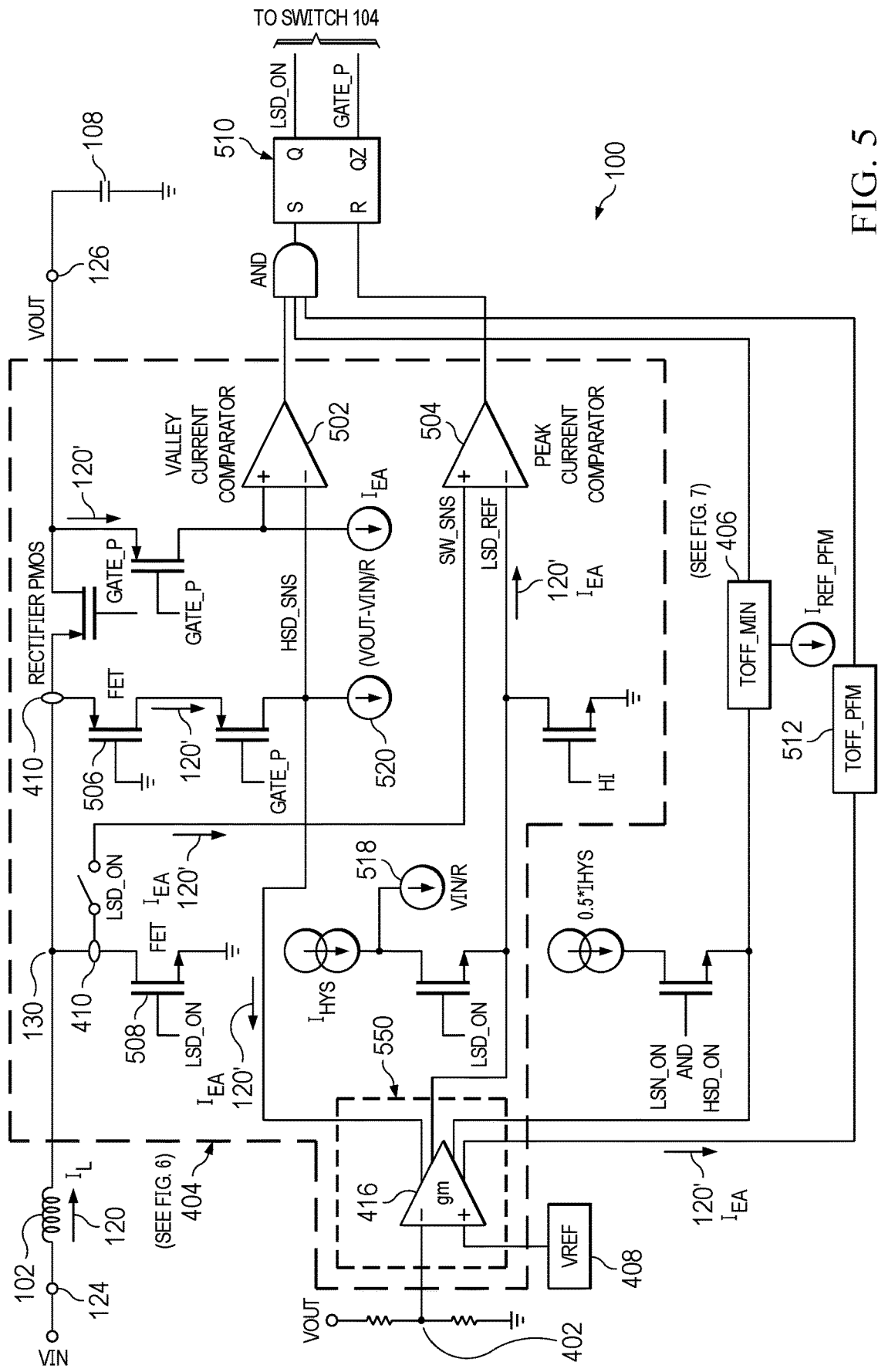
FIG. 5 is a schematic diagram of an example portion of the converter of FIG. 1.
Figure 7:
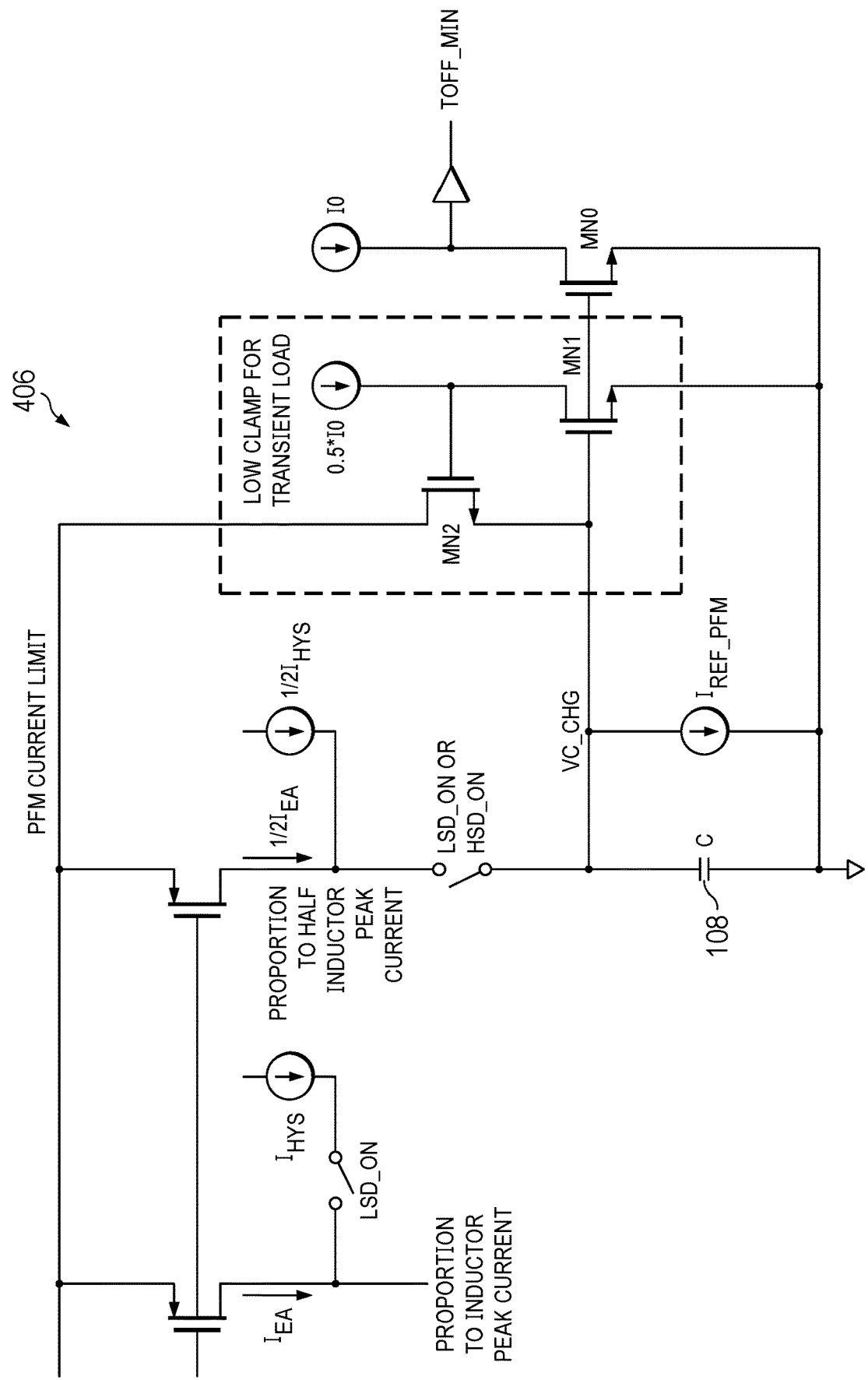
FIG. 7 is a schematic diagram of an example of the minimum time off module of FIGS. 4 and 5.

The minimum time off module 406 (TOFF_MIN) is configured to cause the inductor current 120, 120' to be zero for at least a time $T_{off}$ between switching the inductor 102 while the converter 100 is operating in PFM, such as described in further detail with respect to FIGS. 5 and 7. The time $T_{off}$ is proportional to the inductor peak current, which is pre-configured or configurable so that the inductor average current remains at or within the configured limits while the converter is operating in PFM.

CCM Theory of Operation

FIG. 5 is a schematic diagram of an example portion of the boost converter 100 of FIG. 1. In this example, the converter 100 includes the inductor output 130, the capacitor 108, the clamp circuit 404, an inductor valley current comparator circuit 502, an inductor peak current comparator circuit 504, a valley current sense FET 506, a peak current sense FET 508, a switch control module 510, the minimum time off module 406, a PFM time off module 512, a reference voltage source input node 408, and the transconductance (gm) amplifier 416. For reference, an example portion 550 of the converter 100 includes the clamp circuit 404, the voltage-to-current converter 414, and the gm amplifier 416.

As described above, while the converter 100 is operating in CCM, the clamp circuit 404 is configured to limit (clamp) the inductor current 120 to no greater than a reference current (from reference voltage input node 408) based on the sensed inductor current 410 and a pre-configured or configurable current sense ratio K. Inputs to the inductor valley current comparator circuit 502 are the sensed inductor current 120' ($I_{EA}$) and the output current of the gm amplifier 416 (HSD_SNS). The inductor valley current comparator circuit 502 compares the inductor current 120' ($I_{EA}$) sensed by the valley current sense FET 506 to the output current of the gm amplifier 416, which converts the output voltage of the converter 100 to a current. A current sense ratio K can be configured such that the inductor valley current is K times the output current of the gm amplifier 416.

$$I_{valley} = K * I_{REF}$$

Inputs to the inductor peak current comparator circuit 504 are the sensed inductor current 120 (SW_SNS) and the output current of the gm amplifier 416 (LSD_REF). The inductor peak current comparator circuit 504 compares the inductor current 120' ($I_{EA}$) sensed by the peak current sense FET 508 while the inductor 102 is charging plus the hysteresis $I_{HYS}$ (constant) to the output current of the gm amplifier 416. The current sense ratio K can be configured such that the inductor peak current is K times the output of the gm amplifier 416 plus the hysteresis (ripple) value of the inductor current 120.

$$I_{peak} = K * (I_{REF} + I_{HYS})$$

Thus, Average current limit $= \frac{1}{2} * (I_{valley} + I_{peak}) = \left(I_{REF} + \frac{1}{2} * I_{HYS}\right) * K$ Both $I_{REF}$ and $I_{HYS}$ are configurable values. For example, if the current limit is 1.5 A, the hysteresis current is 0.4 A, and the current sense ratio is 10K, then $I_{HYS}$=40 µA and $I_{REF}$=130 µA.

The outputs of the inductor valley current comparator circuit 502 and the inductor peak current comparator circuit 504 provide control signals at their respective outputs to drive the switch control module 510 to gate the switch 104, as described with respect to FIG. 1, such that the inductor average current remains within the configured limits.

Figure 6:
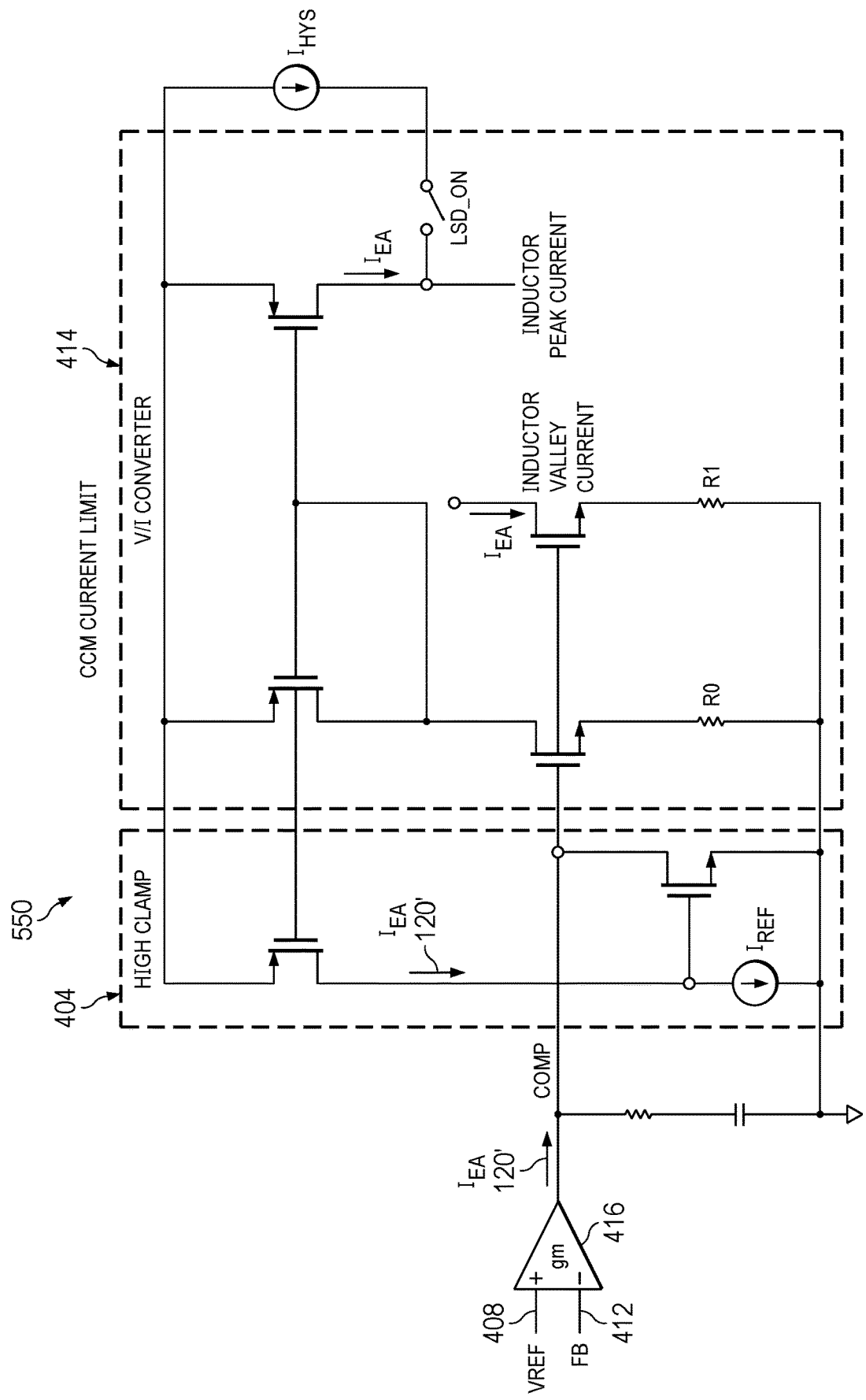
FIG. 6 is a schematic diagram of an example portion of the clamp circuit of FIGS. 4 and 5.

FIG. 6 is a schematic diagram of the example portion 550 of the converter 100 of FIGS. 4 and 5. In CCM operation, the current 120' ($I_{EA}$) output from the voltage-to-current converter 414 is compared to the reference current $I_{REF}$ and is limited by the reference current ($I_{REF}$) by pulling down the COMP node such that the inductor average current remains within the configured limits.

PFM Theory of Operation

Referring again to FIG. 5, in PFM operation, the output current of the gm amplifier 416 is limited by the reference voltage source input node 408 for gating the switch 104 via the switch control module 510, such that the inductor average current remains within the configured limits. More specifically, the output current of the gm amplifier 416 drives the PFM time off module 512 and one-half of the output current of the gm amplifier 416 drives the minimum time off module 406. The outputs of the PFM time off module 512 and the minimum time off module 406 are logically ANDed such that the switch control module 510 gates the switch 104 to limit the inductor average current, such as shown in FIG. 3.

For relatively low current limits, such as 5 mA, the peak inductor current is set relatively high for improved efficiency (e.g., 350 mA). The control portion 114 of the converter 100 includes an internal feedback circuit designed to limit the minimum off time of the inductor current. When the load 112 is relatively low, the off time is longer than the minimum off time due to the load being powered from the capacitor 108 and the output voltage is regulated such that the average current is lower than the current limit. When the load 112 increases, the off time is reduced, which increases the average current since the inductor is conducting current for a longer amount of time. When the off time decreases to the minimum off time, the off time is clamped (limited) at the minimum so as to also limit (clamp) the average current. The minimum off time is based on the reference current of the converter 100, such as described in further detail below.

Figure 8:
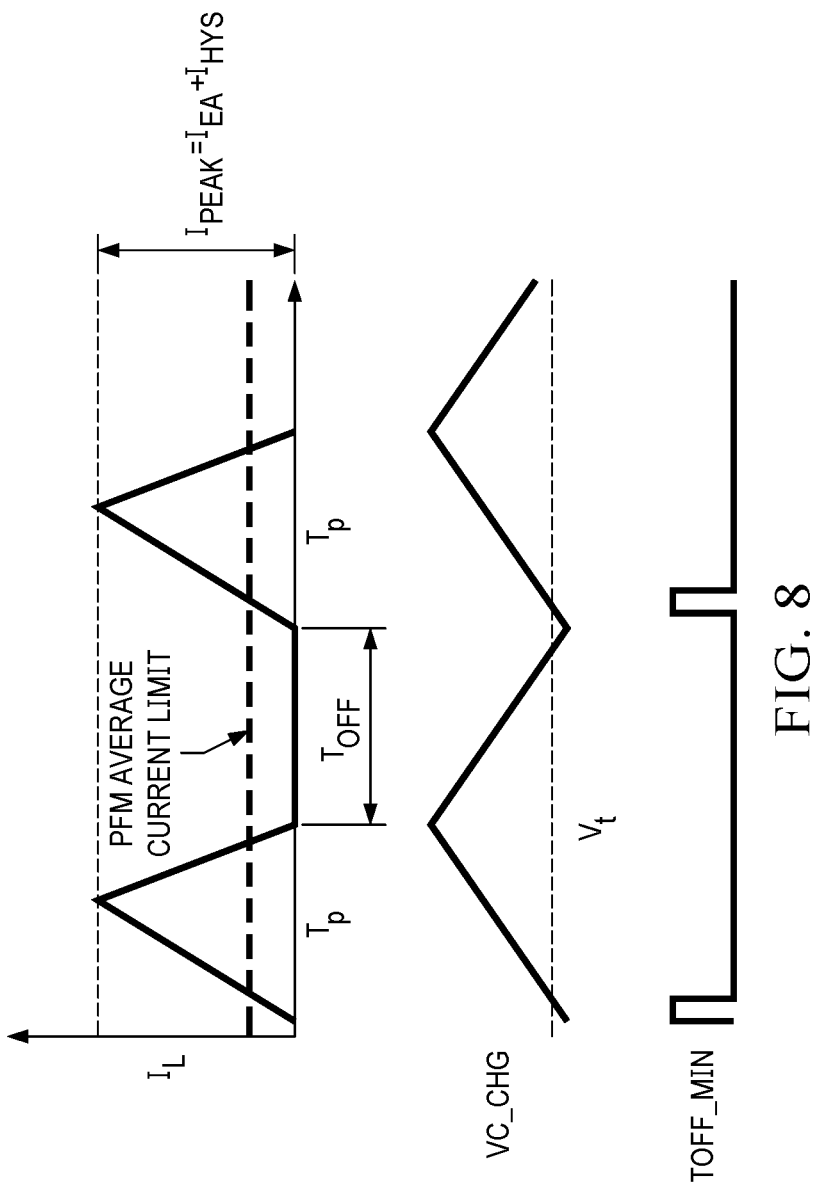
FIG. 8 illustrates example current and control waveforms of the converter of FIGS. 1 and 4-7 while the converter is operating in the pulse frequency modulation mode.

FIG. 7 is a schematic diagram of an example of the minimum time off module 406 for causing at least the $T_{OFF}$ time to occur in PFM. The inductor peak current is defined as:

$$I_{peak}=(I_{ea}+I_{HYS})*K$$

where $I_{EA}$ is an error-adjusted inductor current 120', such as described in further detail below. In PFM operation, the average current limit is:

$$I_{LIM\_PFM} = \frac{1}{2} * I_{peak} * T_p/(T_p + T_{off})$$

where $T_p$ represents the time during which current flows through the inductor 102 (inductor current is greater than zero), such as shown in FIG. 8. Referring again to FIG. 7, MN1 and MN2 are driven with a bias current of 0.5*I0 generate a low clamp voltage on node VC_CHG, which is close to the threshold voltage $V_t$ of I0 and inverter MN0. Under light load conditions where the inductor is not switched often (long off time), VC_CHG is clamped at approximately 20 mV below the threshold voltage ($V_t$) of inverter MN0, which avoids allowing VC_CHG to discharge too low below ($V_t$). As shown in FIG. 8, at the start of a switching cycle of the switch 104 to charge the inductor 102 (TOFF_MIN pulses high to close the switch 104), VC_CHG begins to increase while the output TOFF_MIN is low. After the switch 104 is opened to discharge the inductor 102, VC_CHG begins to decrease until it reaches the threshold voltage $V_t$, at which time a new switching cycle of the switch 104 to charge the inductor 102 begins (TOFF_MIN pulses high).

During cycle time $T_p$, the capacitor 108 receives a current of ½ *($I_{EA}+I_{HYS}$). At all times ($T_p+T_{OFF}$) the capacitor 108 discharges the current $I_{REF\_PFM}$, which is pre-configured or configurable based on the target average current. The charge and discharge voltage is equal on node VC_CHG. Thus, $$\frac{1}{2} * (I_{ea} + I_{HYS}) * T_p = I_{REF\_PFM} * (T_p + T_{OFF})$$

$$I_{REF\_PFM} = \frac{1}{2} * (I_{ea} + I_{HYS}) * \frac{T_p}{T_p + T_{OFF}}$$

$$I_{LIM\_PFM} = K * I_{REF\_PFM}$$

TOFF_MIN is established such that $T_{OFF}$ is long enough to achieve the target average current limit $I_{LIM\_PFM}$ while the converter is operating in PFM by limiting the inductor current over time (including on time and off time). If K=10K, $I_{REF\_PFM}$=0.5 µA, and $I_{LIM\_PFM}$=5 mA, then $I_{EA}$ is clamped to 5 µA during PFM operation to limit the peak inductor current.

Inductor Peak/Valley Current Error Compensation

Referring again to FIG. 5, in some instances there can be a delay in the operation of the inductor valley current comparator circuit 502 and the inductor peak current comparator circuit 504. This delay $T_d$ introduces an error to the inductor peak current, which in turn may cause the converter 100 to overshoot the target inductor peak current (thus increasing the inductor average current). For example, the error can be defined as:

$$I_{peak\_error} = \frac{VIN}{L * T_d}$$

Where VIN is the input voltage, L is the inductance, and $T_d$ represents the delay. If, for example, $T_d$=20 nanoseconds, VIN=3.6V, and L=1 µH, then $I_{peak\_error}$=72 mA. If the inductor peak current is 400 mA, the error for the inductor peak current is less than 20% and approximately 10% for the inductor average current.

In some examples, to reduce the inductor peak current error, an offset current $I_{offset}$ can be added to the sensed inductor current 120 to compensate for the inductor peak current error as indicated at 518 in FIG. 5 to produce an error-adjusted inductor current 120' ($I_{EA}$):

$$I_{offset} = \frac{VIN}{R}$$

$$R = \frac{L}{T_d} * K = 500 \text{ K}$$

$$I_{ea} = I_L + I_{offset}$$

Where $I_L$ is the actual inductor current 120.

Similarly, an offset current $I_{offset}$ can be added to the sensed inductor current 120 to compensate for the valley current error as indicated at 520 in FIG. 5 to produce the error-adjusted inductor current 120'($I_{EA}$):

$$I_{offset} = \frac{(VOUT - VIN)}{R}$$

Example Methodology

Figure 9:
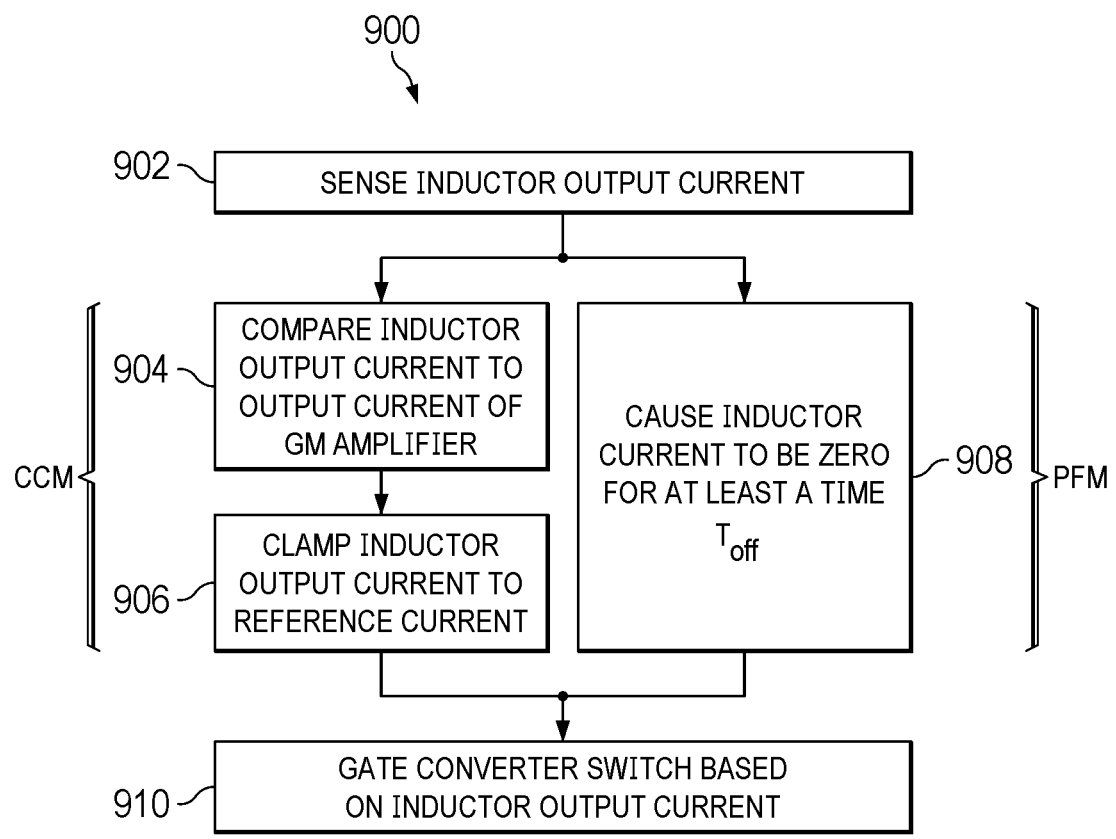
FIG. 9 is a flow diagram of an example method of controlling a DC-to-DC converter.

FIG. 9 is a flow diagram of an example method 900 of controlling a DC-to-DC converter. In this example, the converter includes a switch coupled to an inductor and a power input, and a diode coupled to the inductor and an output terminal of the DC-to-DC converter, such as described with respect to the converter 100 of FIGS. 1 and 4-7. The method 900 includes sensing 902 the inductor output current. For example, as described above, the converter can be configured to limit the average current based at least in part on the inductor peak current and/or the inductor valley current as sensed by, e.g., a sense FET or other suitable current sensing device. The method 900 further includes, in CCM, comparing 904 the sensed inductor output current plus a constant hysteresis current value to the output current of a gm amplifier and clamping 906 the inductor output current to a reference current. For example, as described above, a clamp circuit can be configured to limit (clamp) the inductor current to no greater than a reference current based on the sensed inductor current and a pre-configured or configurable current sense ratio K. As a result, the target average current limit for relatively high currents (e.g., >=100 mA) can be achieved in CCM using suitable design parameters including the current sense ratio and the hysteresis of the inductor output current. The method 900 further includes, in PFM, causing 908 the inductor output current to be zero for at least a time $T_{off}$. For example, as described above, a minimum time off module can be configured to cause the inductor output current to be zero for at least the time $T_{off}$ based at least in part on an inductor peak current. As a result, the target average current limit for relatively low currents (e.g., <=100 mA) can be achieved in PFM using suitable design parameters including the hysteresis current value and the current sense ratio. The method 900 further includes gating 910 the converter switch based at least in part on the inductor output current. For example, the outputs of the clamp circuit and/or the minimum time off module can be used to gate the converter switch such that the average current remains within the target average current limit, such as described with respect to FIGS. 4 and 5.

FURTHER EXAMPLES

Example 1 is a DC-to-DC boost converter includes a switch, a diode, a clamp circuit, and a minimum time off module. The switch is coupled to an inductor and a power input. The diode is coupled to the inductor and an output terminal of the DC-to-DC boost converter and configured to conduct current in only one direction away from the inductor and toward the output terminal of the DC-to-DC boost converter. The clamp circuit is coupled to the diode and the switch. The clamp circuit is configured to clamp an inductor output current to a reference current while the DC-to-DC boost converter is operating in a continuous conduction mode (CCM) of operation. The minimum time off module is coupled to the diode and the switch, the minimum time off module configured to cause the inductor output current to be zero for at least a time Toff while the converter is operating in a pulse frequency modulation (PFM) mode of operation.

Example 2 includes the converter of Example 1, wherein the clamp circuit is configured to clamp the inductor output current based at least in part on an inductor peak current.

Example 3 includes the converter of any one of Examples 1 and 2, wherein the minimum time off module is configured to cause the inductor output current to be zero for at least the time $T_{off}$ based at least in part on an inductor peak current.

Example 4 includes the converter of any one of Examples 1-3, including a transconductance (gm) amplifier and a reference source input node, the gm amplifier coupled to the output terminal of the DC-to-DC boost converter and to the switch via a feedback circuit and configured to convert an output voltage to an output current, the output current of the gm amplifier limited by a reference voltage source.

Example 5 includes the converter of Example 4, including an inductor valley current comparator circuit and an inductor peak current comparator circuit, the inductor valley current comparator circuit including a first comparator coupled to the inductor and the output of the gm amplifier, the inductor peak current comparator circuit including a second comparator coupled to the inductor and the output of the gm amplifier, wherein an output of the inductor valley current comparator circuit and an output of the inductor peak current comparator circuit are each coupled to the switch.

Example 6 includes the converter of Example 5, including a low current sense field effect transistor (FET) coupled to the inductor and the first comparator, and a high current sense FET coupled to the inductor and the second comparator, the low current sense FET configured to sense the inductor output current and provide the sensed inductor output current to the first comparator, the high current sense FET configured to sense the inductor output current and provide the sensed inductor output current to the second comparator.

Example 7 includes the converter of Examples 1-6, wherein, in operation, the inductor output current is less than or equal to 1.5 A and greater than or equal to 5 mA.

Example 8 is a method of controlling a DC-to-DC converter. The DC-to-DC converter includes a switch coupled to an inductor and a power input, and a diode coupled to the inductor and an output terminal of the DC-to-DC boost converter. The method includes clamping, by a clamp circuit and in a continuous conduction mode (CCM) of operation, an inductor output current to a reference current. The method further includes causing, by a minimum time off module and in a pulse frequency modulation (PFM) mode of operation, the inductor output current to be zero for at least a time Toff.

Example 9 includes the method of Example 8, including clamping, by the clamp circuit, the inductor output current based at least in part on an inductor peak current.

Example 10 includes the method of any one of Examples 8 and 9, wherein causing, by the minimum time off module, the inductor output current to be zero for at least the time Toff is based at least in part on an inductor peak current.

Example 11 includes the method of any one of Examples 8-10, including converting, by a transconductance (gm) amplifier coupled to the output terminal of the DC-to-DC boost converter, an output voltage to an output current, the output current of the gm amplifier being limited by a current output from a reference source input node.

Example 12 includes the method of any one of Examples 8-11, including comparing, by an inductor valley current comparator the inductor output current to the output current of the gm amplifier, and comparing, by an inductor peak comparator, the inductor output current plus a constant hysteresis current value to the output current of the gm amplifier, wherein the switch is gated based on outputs of the inductor valley current comparator and the inductor peak current comparator.

Example 13 includes the method of Example 12, including sensing, by a low current sense field effect transistor (FET) the inductor output current; providing, by the low current sense FET, the sensed inductor output current to the inductor valley current comparator; sensing, by a high current sense FET, the inductor output current; and providing, by the high current sense FET, the sensed inductor output current to the inductor peak current comparator.

Example 14 is a device including a power source, a DC-to-DC boost converter coupled to the power source at a power input, and a load input coupled to an output terminal of the DC-to-DC boost converter. The power source is configured to provide, to the converter, an output voltage of at most 1.5 volts and an output current of at most 1.5 amps. The converter is configured to provide, to the load input, an output voltage of greater than 1.5 volts and an output current of at least 5 milliamps.

Example 15 includes the device of Example 14, including an inductor; a switch coupled to the inductor and the power input; a diode coupled to the inductor and the output terminal of the DC-to-DC boost converter; a capacitor coupled to the diode and the output terminal of the DC-to-DC boost converter; a clamp circuit coupled to the diode and the switch, the clamp circuit configured to clamp an inductor output current to a reference current while the converter is operating in a continuous conduction mode (CCM) of operation; and a minimum time off module coupled to the diode and the switch, the minimum time off module configured to cause the inductor output current to be zero for at least a time Toff while the converter is operating in a pulse frequency modulation (PFM) mode of operation.

Example 16 includes the device of any one of Examples 14 and 15, wherein the clamp circuit is configured to clamp the inductor output current based at least in part on an inductor peak current.

Example 17 includes the device of any one of Examples 14-16, wherein the minimum time off module is configured to cause the inductor output current to be zero for at least the time Toff based at least in part on an inductor peak current.

Example 18 includes the device of any one of Examples 14-17, including a transconductance (gm) amplifier and a reference source input node, the gm amplifier coupled to the output terminal of the DC-to-DC boost converter and configured to convert an output voltage to an output current, the output current of the gm amplifier limited by a current output from the reference source input node.

Example 19 includes the device of any one of Examples 14-18, including an inductor valley current comparator and an inductor peak current comparator, the inductor valley current comparator configured to compare the inductor output current to the output current of the gm amplifier, the inductor peak comparator configured to compare the inductor output current plus a constant hysteresis current value to the output current of the gm amplifier, wherein the switch is gated based on outputs of the inductor valley current comparator and the inductor peak current comparator.

Example 20 includes the device of Example 19, including a low current sense field effect transistor (FET) and a high current sense FET, the low current sense FET configured to sense the inductor output current and provide the sensed inductor output current to the inductor valley current comparator, the high current sense FET configured to sense the inductor output current and provide the sensed inductor output current to the inductor peak current comparator.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device, or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)). Furthermore, the devices may be implemented in/over a silicon substrate (Si), a silicon carbide substrate (SiC), a gallium nitride substrate (GaN) or a gallium arsenide substrate (GaAs).

References herein to a field effect transistor (FET) being "ON" means that the conduction channel of the FET is present and drain current may flow through the FET. References herein to a FET being "OFF" means that the conduction channel is not present and drain current does not flow through the FET. A FET that is OFF, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described examples, and other examples are possible within the scope of the claims.

What is claimed is:

1. A DC-to-DC boost converter comprising:
   a switch coupled to an inductor output and a power input;
   a diode coupled to the inductor output and an output terminal and configured to conduct current in only one direction away from the inductor output and toward the output terminal;
   a clamp circuit coupled to the diode and the switch, the clamp circuit configured to clamp an inductor output current to a reference current while the converter is operating in a continuous conduction mode (CCM) of operation; and
   a minimum time off module coupled to the diode and the switch, the minimum time off module configured to cause the inductor output current to be zero for at least a time $T_{off}$ while the converter is operating in a pulse frequency modulation (PFM) mode of operation.

2. The converter of claim 1, wherein the clamp circuit is configured to clamp the inductor output current based at least in part on an inductor peak current.

3. The converter of claim 1, wherein the minimum time off module is configured to cause the inductor output current to be zero for at least the time $T_{off}$ based at least in part on an inductor peak current.

4. The converter of claim 1, further comprising a transconductance (gm) amplifier and a reference source input node, the gm amplifier coupled to the output terminal and to the switch via a feedback circuit and configured to convert an output voltage to an output current, the output current of the gm amplifier limited by a reference voltage source.

5. The converter of claim 4, further comprising an inductor valley current comparator circuit and an inductor peak current comparator circuit, the inductor valley current comparator circuit including a first comparator coupled to the inductor output and the output of the gm amplifier, the inductor peak current comparator circuit including a second comparator coupled to the inductor output and an output of the gm amplifier, wherein an output of the inductor valley current comparator circuit and an output of the inductor peak current comparator circuit are each coupled to the switch.

6. The converter of claim 5, further comprising a low current sense field effect transistor (FET) coupled to the inductor output and the first comparator, and a high current sense FET coupled to the inductor output and the second comparator, the low current sense FET configured to sense the inductor output current and provide the sensed inductor output current to the first comparator, the high current sense FET configured to sense the inductor output current and provide the sensed inductor output current to the second comparator.

7. The converter of claim 1, wherein, in operation, the inductor output current is less than or equal to 1.5 A and greater than or equal to 5 mA.

8. A method of controlling a DC-to-DC converter comprising a switch coupled to an inductor output and a power input, and a diode coupled to the inductor output and an output terminal, the method comprising:
   clamping, by a clamp circuit and in a continuous conduction mode (CCM) of operation, an inductor output current to a reference current; and
   causing, by a minimum time off module and in a pulse frequency modulation (PFM) mode of operation, the inductor output current to be zero for at least a time $T_{off}$.

9. The method of claim 8, further comprising clamping, by the clamp circuit, the inductor output current based at least in part on an inductor peak current.

10. The method of claim 8, wherein causing, by the minimum time off module, the inductor output current to be zero for at least the time $T_{off}$ is based at least in part on an inductor peak current.

11. The method of claim 8, further comprising converting, by a transconductance (gm) amplifier coupled to the output terminal, an output voltage to an output current, the output current of the gm amplifier being limited by a current output from a reference source input node.

12. The method of claim 11, further comprising comparing, by an inductor valley current comparator the inductor output current to the output current of the gm amplifier, and comparing, by an inductor peak comparator, the inductor output current plus a constant hysteresis current value to the output current of the gm amplifier, wherein the switch is gated based on outputs of the inductor valley current comparator and the inductor peak current comparator.

13. The method of claim 12, further comprising sensing, by a low current sense field effect transistor (FET) the inductor output current; providing, by the low current sense FET, the sensed inductor output current to the inductor valley current comparator; sensing, by a high current sense FET, the inductor output current; and providing, by the high current sense FET, the sensed inductor output current to the inductor peak current comparator.

14. A device comprising: a power input; a DC-to-DC boost converter coupled to the power input; and a load input coupled to an output terminal of the DC-to-DC boost converter, wherein a power source is configured to provide, to the converter, an output voltage of at most 1.5 volts and an output current of at most 1.5 amps, and wherein the converter is configured to provide, to the load input, an output voltage of greater than 1.5 volts and an output current of at least 5 milliamps; wherein the converter comprises: an inductor output; a switch coupled to the inductor output and the power input; a diode coupled to the inductor output and the output terminal of the DC-to-DC boost converter; a capacitor coupled to the diode and the output terminal of the DC-to-DC boost converter; a clamp circuit coupled to the diode and the switch, the clamp circuit configured to clamp an inductor output current to a reference current while the converter is operating in a continuous conduction mode (CCM) of operation; and a minimum time off module coupled to the diode and the switch, the minimum time off module configured to cause the inductor output current to be zero for at least a time Toff while the converter is operating in a pulse frequency modulation (PFM) mode of operation.

15. The device of claim 14, wherein the clamp circuit is configured to clamp the inductor output current based at least in part on an inductor peak current.

16. The device of claim 14, wherein the minimum time off module is configured to cause the inductor output current to be zero for at least the time Toff based at least in part on an inductor peak current.

17. The device of claim 14, further comprising a transconductance (gm) amplifier and a reference source input node, the gm amplifier coupled to the output terminal of the DC-to-DC boost converter; and wherein a voltage-to-current converter is configured to receive an error output voltage of the gm amplifier and convert the error output voltage into an output current.

18. The device of claim 17, further comprising an inductor valley current comparator and an inductor peak current comparator, the inductor valley current comparator configured to compare the inductor output current to the output current of the gm amplifier, the inductor peak comparator configured to compare the inductor output current plus a constant hysteresis current value to the output current of the gm amplifier, wherein the switch is gated based on outputs of the inductor valley current comparator and the inductor peak current comparator.

19. The device of claim 18, further comprising a low current sense field effect transistor (FET) and a high current sense FET, the low current sense FET configured to sense the inductor output current and provide the sensed inductor output current to the inductor valley current comparator, the high current sense FET configured to sense the inductor output current and provide the sensed inductor output current to the inductor peak current comparator.

* * * * *